Sept. 29, 1959   W. E. LIVINGSTON   2,906,625
METHOD OF CONCENTRATING OFF-QUALITY PEANUTS
Filed Dec. 2, 1957
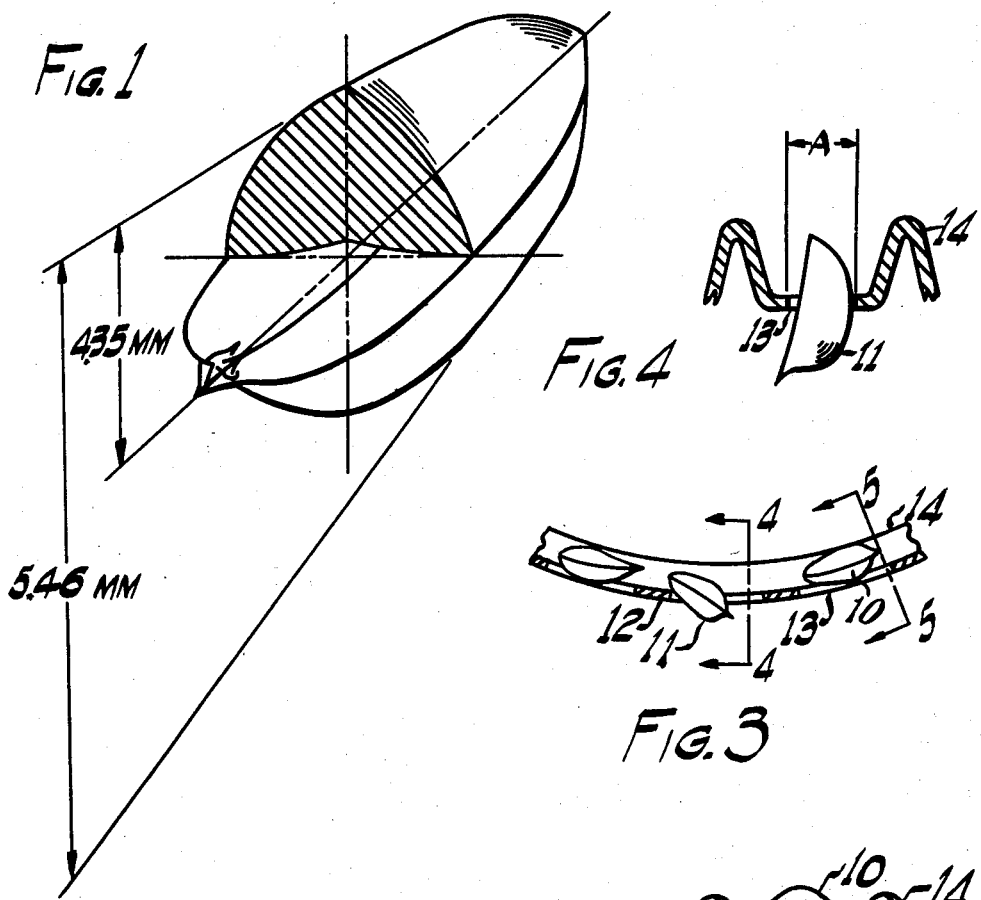
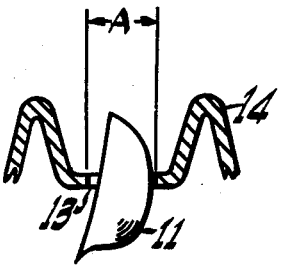
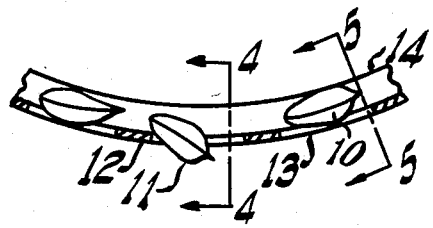
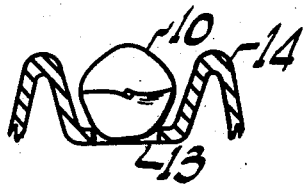
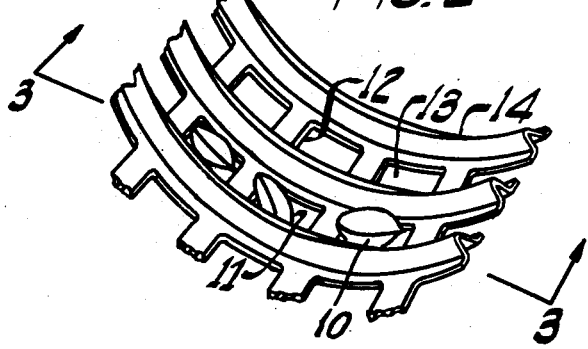
WAYNE E. LIVINGSTON
INVENTOR.
BY R.G. Story

United States Patent Office 2,906,625
Patented Sept. 29, 1959

2,906,625

METHOD OF CONCENTRATING OFF-QUALITY PEANUTS

Wayne Edward Livingston, Park Forest, Ill., assignor to Swift & Company, Chicago, Ill., a corporation of Illinois Application December 2, 1957, Serial No. 700,045

2 Claims. (Cl. 99—126)

The present invention generally is directed to an improvement in a process of preparing peanut butter. More specifically, the present invention relates to a method for removing pickouts from roasted split-blanched peanuts.

Many of the problems faced by peanut butter manufacturers are caused by the presence of pickouts (moldy, rancid, unblanched, and/or burnt peanuts) in roasted split-blanched nuts. If peanut butter is prepared from split-blanched nuts containing from 1–3% pickouts, small particles of unground skin or specks are noticeable in the final product. When the percentage of pickouts is greater than 3%, these specks give the peanut butter an objectionable appearance. A lot of roasted split-blanched nuts often contains as much as 6–15% pickouts; and, where such raw materials are used, the peanut butter may have an unacceptable flavor and its shelf life usually is shortened.

Up to the present time, quality picking of roasted split-blanched peanuts largely has been accomplished manually. Because this operation is slow and expensive, a considerable amount of research has been undertaken either to find methods of increasing the efficiency of pickers or to develop mechanical or electrical means of removing pickouts. One such development which has been used in conjunction with manual picking is an electric-eye sorting machine. The operation of this machine is based on the fact that the amount of light reflected from the surface of a damaged peanut is less than that reflected from a sound nut. The electric eye is set so that a rejection device is actuated when the amount of reflected light falls below a given level.

Machines of this type, however, do not ordinarily have a capacity sufficiently large to efficiently handle split nuts. It has been found, for example, that a single electric-eye installation can only handle about 200 lbs. of split Spanish or Runner peanuts per hour. Inasmuch as split nuts are usually processed at a rate of about a ton an hour such a capacity would ordinarily be insufficient.

Similarly, tests conducted under optimum plant conditions have indicated that one person can only remove about 2.2 lbs. of pickouts per hour where the nuts are moving at a rate of 2,000 lbs. per hour. A group of 4 pickers could, therefore, remove only about 8.8 lbs. of pickouts from a 2,000 lb. lot. Because lots of this size often contain as much as 200 lbs. or more of pickouts, this manual system would either not be effective in producing a quality product or would require too great a period of time to be commercially feasible.

It is therefore an object of the present invention to provide a method of removing pickouts which rapidly reduces the percentage of off-quality nuts to an acceptable level.

Another object of the invention is to provide a method of removing pickouts which can advantageously be used in conjunction with an electric-eye sorting machine.

Other objects will become readily apparent to one skilled in the art from the following detailed description of the invention.

In general, the present invention is based on the discovery that from 50–80% of the off-quality roasted nuts taken from a blanching machine are whole peanuts. This observation, coupled with information on the exact size difference between whole nuts and split nuts allows a processor to rapidly remove a portion of the pickouts from a lot by appropriate screening means.

In the drawings,

Figure 1 is a perspective view of a typical peanut.

Figure 2 is a perspective view of a section of a screening means.

Figure 3 is an enlargd section taken through line 3—3 of Figure 2.

Figure 4 is an enlarged section taken through line 4—4 of Figure 3.

Figure 5 is an enlarged section taken through line 5—5 of Figure 3.

In Figure 1, the average cross-sectional height of a split Runner peanut and the average diameter of a Runner pickout is given as 4.35 mm. and 5.46 mm. respectively. It was found statistically from studies made of #1 grade Runner peanuts that split nuts fall into a size category of 4.35 mm. plus or minus 1.00 mm. and that pickouts had an average diameter of 5.46 mm. plus or minus 1.10 mm. Applying this information to the present invention, it was determined that slotted screens having perforations of ¾" x 13/64" would allow a maximum percentage of split nuts to pass and would prevent a maximum percentage of whole pickouts from falling through.

Figure 2 represents a perspective view of a section of a commercially available slotted metal screen which may be utilized in the present invention to pass a maximum percent of splits and retain a maximum percent of pickouts. In the drawing, whole peanut 10 is resting within perforation 13 and saddle 14. Half peanut or split nut 11 is shown passing through perforation 13 of slotted screen 12.

Figure 3 is an enlarged view taken through line 3—3 of Figure 2. In this figure the whole nut 10 is resting within perforation 13 of screen 12.

Figure 4 is an enlarged cross section view taken through line 4—4 of Figure 3. A split nut 11 is passing through perforation 13 after it has been turned or lined up by saddle 14. The width A of perforation 13 is sufficiently large to pass split nut 11.

Figure 5 is also an enlarged cross section view, and is taken through line 5—5 of Figure 3. In this view whole peanut 10 is held within perforation 13. The dimension A of perforation 13 is sufficiently large to pass split nut 11 of Figure 4 but is small enough to retain whole nut 10 of Figure 5.

Although a simple screen having properly sized perforations could be hand operated to remove split nuts from whole nuts, it is desirable in commercial operations to use a machine operated separator or grader. One such separator is the Carter precision grader No. 532.

A typical mechanical separating means consists of a rotatable cylinder having slotted perforations of a given size. Saddles such as are shown in Figures 2–5 of the attached drawing form grooves around the perforations and cause split peanuts to be presented up-edged to the perforations. Rubber strips on a rotating cleaner are used to tap intermediate size peanuts causing them to drop back into the overs.

Another separating means suitable for use in the present invention is described in the United States patent to Frank, No. 1,496,411. The device consists of cylindrical screen 24, funnel 22, and escape point 29.

The following flow sheet shows the composition of a typical lot of #1 Runner peanuts which have been roasted, split-blanched, and passed through a mechanical separator at a rate of 2,000 lbs. per hour:

Carter Precision Grader No. 532

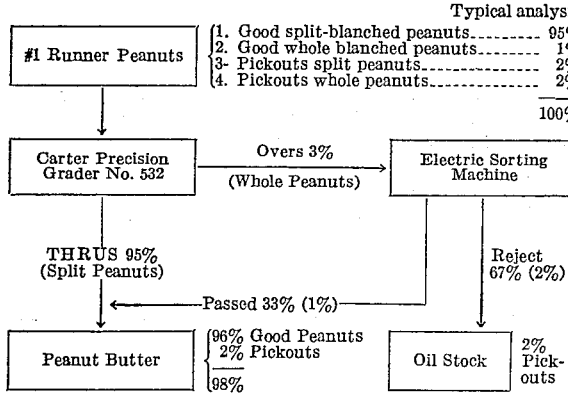

Pickers

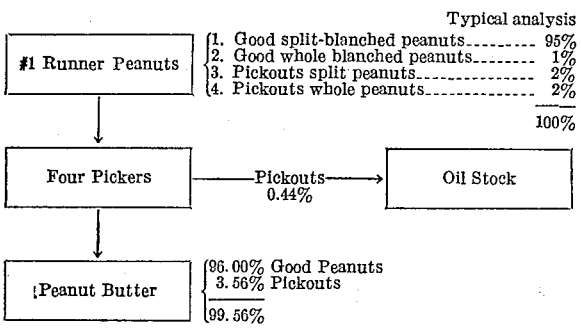

In the second diagram, four pickers were able to remove only 0.44% of the peanuts from a lot where a rate of 2,000 lbs. per hour was maintained. For this reason 3.56% of the peanuts used in preparing peanut butter were below standard. In contrast, where the subject invention was used to concentrate off quality peanuts, the final peanut butter product contained only about 2% pickouts.

Although the results would vary according to the quality of the peanuts involved, it is obvious that a mechanical grader or separator capable of carrying out the subject invention would substantially lower the unit cost of manufacturing peanut butter. It would take about eighteen pickers, for example, to match the amount of pickouts removed by the mechanical grader used in the flow sheet set forth above where the nuts were processed at a rate of 2,000 lbs. per hour.

The use of this method of concentrating off quality peanuts also makes it feasible to employ an electric-eye sorting machine. As was stated above, sorting machines only have a capacity of approximately 200 lbs. of Spanish or Runner peanuts per hour. In the present process the electric sorting machine only grades 3% of the total amount of peanuts.

The present method can be used with any peanut which is roasted and split-blanched and later processed into peanut butter. Runner peanuts, Spanish peanuts, and Virginia peanuts are the three types of nuts commonly used in preparing peanut butter. Virginia peanuts would require a slot size slightly larger than the ¾" x 13/64" which was found to be about the proper size for #1 grade Runner peanuts. Similarly, Spanish peanuts would require a smaller slot size than that used with Runner peanuts.

One of the commercially available split-blanching machines that is suitable for use in the present invention is the Bauer split-nut blancher No. 341.

Obviously many modifications and variations of the invention as hereinbefore set forth may be made without departing from the spirit and scope thereof, and therefore only such limitations should be imposed as are indicated in the appended claims.

I claim:

1. An improved method of concentrating off quality peanuts which comprises: treating raw peanuts with a roasting and a split-blanching means and subsequently moving said peanuts over a screen having perforations of a proper size to allow peanut halves to pass through said screen and to retain whole nuts.

2. An improved method of concentrating off quality peanuts which comprises: treating raw peanuts with a roasting and split-blanching means, moving said roasted and split-blanched peanuts over a screen having perforations of a proper size to allow peanut halves to pass through said screen and to retain whole nuts, and thereafter subjecting said whole peanuts to an electric-eye sorting means whereby satisfactory nuts are separated from said whole peanuts.

References Cited in the file of this patent

"Peanut Butter," by Freeman et al., United States Department of Agriculture, Southern Regional Research Laboratory, New Orleans, Louisiana, March 1954, page 7.